United States Patent
Eller et al.

(10) Patent No.: US 10,099,777 B2
(45) Date of Patent: Oct. 16, 2018

(54) ELEVATOR LOAD ALLEVIATING CONTROL FOR A ROTARY WING AIRCRAFT

(71) Applicant: Sikorsky Aircraft Corporation, Stratford, CT (US)

(72) Inventors: Erez Eller, Oakville, CT (US); Aaron L. Greenfield, Shelton, CT (US); Ole Wulff, Ansonia, CT (US); Matthew A. White, Milford, CT (US); Matthew T. Luszcz, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 95 days.

(21) Appl. No.: 15/300,972

(22) PCT Filed: Apr. 2, 2014

(86) PCT No.: PCT/US2014/032638
§ 371 (c)(1),
(2) Date: Sep. 30, 2016

(87) PCT Pub. No.: WO2015/152910
PCT Pub. Date: Oct. 8, 2015

(65) Prior Publication Data
US 2017/0029093 A1    Feb. 2, 2017

(51) Int. Cl.
*B64C 13/50* (2006.01)
*B64C 27/08* (2006.01)
(Continued)

(52) U.S. Cl.
CPC ............ *B64C 13/503* (2013.01); *B64C 13/18* (2013.01); *B64C 27/08* (2013.01); *B64C 27/82* (2013.01);
(Continued)

(58) Field of Classification Search
CPC ....... B64C 13/503; B64C 27/08; B64C 13/18; B64C 27/82; B64C 2027/8281; B64C 2027/8236; B64C 2027/8272; Y02T 50/44
See application file for complete search history.

(56) References Cited

U.S. PATENT DOCUMENTS

| 8,167,233 B2 * | 5/2012 | Brody ................... B64C 27/10 244/17.21 |
| 2003/0106958 A1 | 6/2003 | Gold et al. |

(Continued)

FOREIGN PATENT DOCUMENTS

WO    2014045276 A1    3/2014

OTHER PUBLICATIONS

PCT International Search Report and Written Opinion; International Application No. PCT/US2014/032638; International Filing Date: Apr. 2, 2014; dated Aug. 22, 2014; pp. 1-13.

*Primary Examiner* — Frederick M Brushaber
(74) *Attorney, Agent, or Firm* — Cantor Colburn LLP

(57) ABSTRACT

One aspect is a flight control system for a rotary wing aircraft including a main rotor system and an elevator control system. A flight control computer of the flight control system includes processing circuitry configured to execute control logic. The control logic includes an inverse plant model that produces a main rotor feed forward command based on a pitch rate command, and a load alleviation control filter configured to reduce loads on a main rotor system and produce an elevator command for an elevator control system. A transformed elevator command filter produces a main rotor pitch adjustment command based on the elevator command, and a main rotor command generator generates an augmented main rotor feed forward command for the main rotor system based on the main rotor feed forward command and the main rotor pitch adjustment command.

20 Claims, 5 Drawing Sheets

(51) Int. Cl.
*B64C 13/18* (2006.01)
*B64C 27/82* (2006.01)

(52) U.S. Cl.
CPC ............... *B64C 2027/8236* (2013.01); *B64C 2027/8272* (2013.01); *B64C 2027/8281* (2013.01); *Y02T 50/44* (2013.01)

(56) References Cited

U.S. PATENT DOCUMENTS

| | | |
|---|---|---|
| 2006/0231677 A1* | 10/2006 | Zimet ................... A63H 27/12 244/17.23 |
| 2008/0237392 A1 | 10/2008 | Piasecki et al. |
| 2010/0168939 A1 | 7/2010 | Doeppner et al. |
| 2011/0057071 A1 | 3/2011 | Sahasrabudhe |
| 2012/0136512 A1 | 5/2012 | Kubik et al. |
| 2012/0153072 A1 | 6/2012 | Eglin et al. |

\* cited by examiner

US 10,099,777 B2

ELEVATOR LOAD ALLEVIATING CONTROL FOR A ROTARY WING AIRCRAFT

CROSS REFERENCE TO RELATED APPLICATIONS

The present application is a National Stage Application claiming priority to Patent Application PCT/US2014/032638 filed on Apr. 2, 2014, the contents of which are incorporated herein by reference in their entirety.

BACKGROUND OF THE INVENTION

Embodiments of the invention generally relate to a control system of a rotary wing aircraft, and more particularly, to an elevator load alleviating control for a rotary wing aircraft.

A main rotor system of a rotary wing aircraft, including a main rotor shaft and hub, typically experiences greater forces and moments during certain maneuvers. For example, during pitch transient maneuvers, the main rotor system typically generates large pitch moments to overcome the stabilizing moment of a tail section of the rotary wing aircraft with a fixed tail and no elevator. As a result, relatively large moments are applied to the main rotor shaft and hub, which increases the aircraft structural requirements and weight. Also, higher loads, such as peak static and recurring fatigue loads, on aircraft components can decrease expected component life.

Therefore, a need exists to reduce loads on the main rotor system of a rotary wing aircraft while maintaining satisfactory flying qualities.

BRIEF DESCRIPTION OF THE INVENTION

According to one embodiment, a flight control system for a rotary wing aircraft including a main rotor system and an elevator control system is provided. The flight control system includes a flight control computer configured to interface with the main rotor system and the elevator control system. The flight control computer includes processing circuitry configured to execute control logic. The control logic includes an inverse plant model that produces a main rotor feed forward command based on a pitch rate command, and a load alleviation control filter configured to reduce loads on the main rotor system and produce an elevator command for the elevator control system. The control logic also includes a transformed elevator command filter that produces a main rotor pitch adjustment command based on the elevator command, and a main rotor command generator that generates an augmented main rotor feed forward command for the main rotor system based on the main rotor feed forward command and the main rotor pitch adjustment command.

In addition to one or more of the features described above or below, or as an alternative, further embodiments could include where the TEC filter includes a ratio of an inverse plant for a model of a main rotor input to pitch rate relative to an inverse plant for a model of an elevator to pitch rate.

In addition to one or more of the features described above or below, or as an alternative, further embodiments could include a feedback processor that converts feedback from a plurality of sensors into a main rotor feedback adjustment command. The main rotor command generator may be further configured to generate the augmented main rotor feed forward command for the main rotor system as a summation of the main rotor feed forward command, the main rotor pitch adjustment command, and the main rotor feedback adjustment command.

In addition to one or more of the features described above or below, or as an alternative, further embodiments could include a delay element configured to delay the elevator command to the elevator control system such that a response of the elevator control system to the elevator command corresponds with a response of the main rotor system to the augmented main rotor feed forward command.

In addition to one or more of the features described above or below, or as an alternative, further embodiments could include where the LAC filter, the TEC filter, and the delay element are configurable based on at least one flight regime parameter.

In addition to one or more of the features described above or below, or as an alternative, further embodiments could include where the elevator command produced by the LAC filter is a feed forward command based on the pitch rate command.

In addition to one or more of the features described above or below, or as an alternative, further embodiments could include where the elevator command produced by the LAC filter is a feedback command based on a load related feedback signal.

In addition to one or more of the features described above or below, or as an alternative, further embodiments could include where the rotary wing aircraft further includes an auxiliary propulsor configured as a pusher propeller, and the main rotor system further comprises dual contra-rotating main rotors.

According to another embodiment, a rotary wing aircraft includes a main rotor system, an elevator control system, and a flight control computer configured to receive maneuvering inputs. The flight control computer is coupled to the main rotor system and the elevator control system. The flight control computer includes processing circuitry configured to execute control logic. The control logic includes an inverse plant model that produces a main rotor feed forward command based on a pitch rate command, and a load alleviation control filter configured to reduce loads on the main rotor system and produce an elevator command for the elevator control system. The control logic also includes a transformed elevator command filter that produces a main rotor pitch adjustment command based on the elevator command, and a main rotor command generator that generates an augmented main rotor feed forward command for the main rotor system based on the main rotor feed forward command and the main rotor pitch adjustment command.

A further embodiment includes a method of providing elevator load alleviating control on a rotary wing aircraft that includes a main rotor system and an elevator control system. A pitch rate command is received, and a main rotor feed forward command is produced based on the pitch rate command. An elevator command for the elevator control system is produced to reduce loads on the main rotor system. A main rotor pitch adjustment command is produced based on the elevator command. An augmented main rotor feed forward command for the main rotor system is generated based on the main rotor feed forward command and the main rotor pitch adjustment command.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Exemplary embodiments provide elevator load alleviating control for a rotary wing aircraft including an active elevator. In exemplary embodiments, elevator load alleviating control methods take advantage of redundant control surfaces and a fly-by-wire control system to balance flight loads between a rotor system and tail section of a rotary wing aircraft in a way that optimizes component life and aircraft weight. Since a fuselage transition section of a rotary wing aircraft is typically designed for more-critical crash or ground handling loads, there may be additional structural capability inherent in the fuselage beyond what is required to react to flight loads. To take advantage of an existing high-strength structure in the fuselage and reduce the loads applied to the rotor system during maneuvering flight, exemplary embodiments redistribute loads between the rotor system and active elevators of the tail section while maintaining system stability. Load redistribution can be performed in either direction, such as a load increase to the rotor system to decrease fuselage loads if the fuselage is damaged or if the load shift is needed to perform a particular maneuver.

Figure 1:
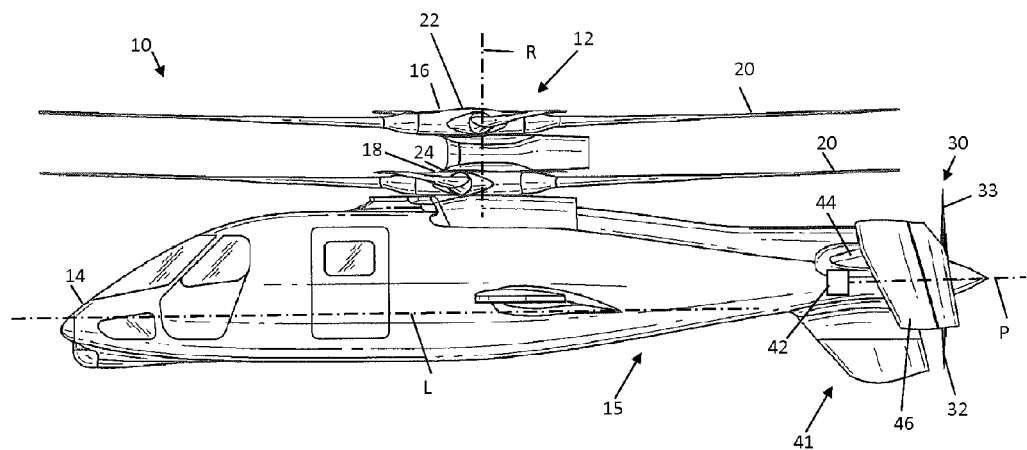
FIG. 1 is a general side view of an exemplary rotary wing aircraft in accordance with embodiments.
Figure 2:
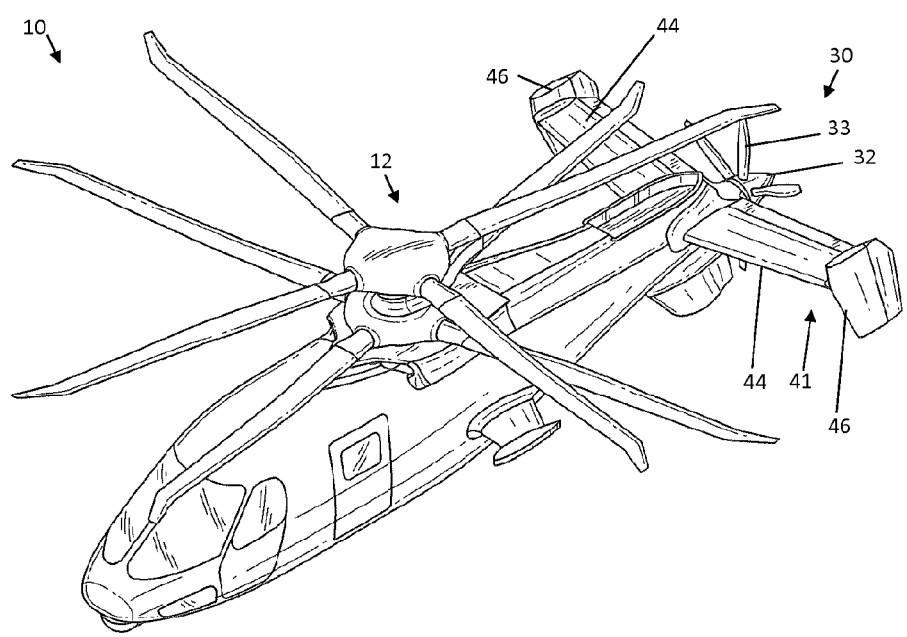
FIG. 2 is a perspective view of the exemplary rotary wing aircraft of FIG. 1.

FIGS. 1 and 2 illustrate an exemplary vertical takeoff and landing (VTOL) high speed compound or coaxial contra-rotating rigid rotor aircraft 10 having a dual, contra-rotating main rotor system 12, which rotates about a rotor axis of rotation R. The aircraft 10 includes an airframe 14 which supports the dual, contra-rotating, coaxial main rotor system 12 as well as a translational thrust system 30 which provides translational thrust generally parallel to an aircraft longitudinal axis L. A fuselage transition section 15 of the aircraft 10 is disposed between the main rotor system 12 and the translational thrust system 30.

The main rotor system 12 includes an upper rotor system 16 and a lower rotor system 18 as dual contra-rotating main rotors in a coaxial configuration. A plurality of rotor blade assemblies 20 are mounted to a rotor hub 22, 24 of each rotor system 16, 18, respectively. The translational thrust system 30 may be any propeller system including, but not limited to a pusher propeller, a tractor propeller, a nacelle mounted propeller, etc. In the example of FIGS. 1-2, the translational thrust system 30 includes an auxiliary propulsor 32. In an embodiment, the auxiliary propulsor 32 is a pusher propeller system with a propeller rotational axis P oriented substantially horizontal and parallel to the aircraft longitudinal axis L to provide thrust for high speed flight. Although a particular rotary wing aircraft configuration is illustrated and described in the disclosed non-limiting embodiment, other configurations and/or machines with rotor systems are within the scope of the present invention.

In the example of FIGS. 1 and 2, the auxiliary propulsor 32 includes a plurality of propeller blades 33 and is positioned at a tail section 41 of the aircraft 10. The tail section 41 includes active elevators 44 and active rudders 46 as controllable surfaces, as best seen in FIG. 2. Exemplary embodiments include an elevator control system 42 (illustrated schematically in FIG. 1) configured to control the active elevators 44. While only a limited number of elements and systems of the aircraft 10 are described in reference to FIGS. 1 and 2, it will be understood that a number of other control systems and known aircraft elements included in the aircraft 10 are not described in detail for ease of explanation.

Figure 3:
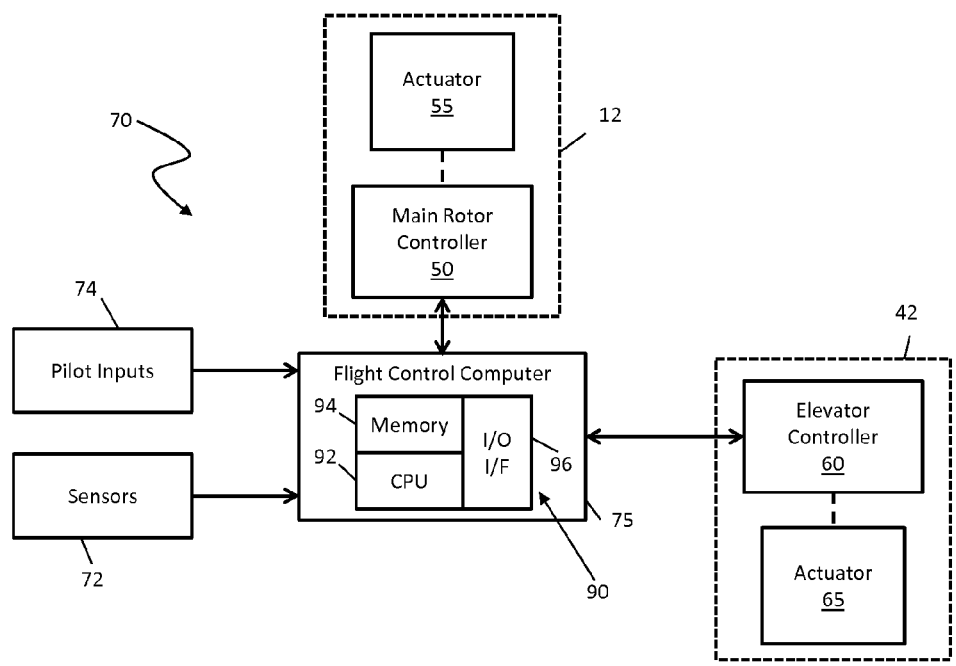
FIG. 3 is a schematic diagram of a flight control system of a rotary wing aircraft according to an embodiment.

Portions of the aircraft 10, such as the main rotor system 12 and the elevator control system 42 for example, are controlled by a flight control system 70 illustrated in FIG. 3. In one embodiment, the flight control system 70 is a fly-by-wire (FBW) control system. In a FBW control system, there is no direct mechanical coupling between a pilot's controls and movable components such as rotor blade assemblies 20 or active elevators 44 of the aircraft 10 of FIGS. 1 and 2. Instead of using mechanical linkages, a FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive maneuvering inputs 74 as control commands from various sources. For instance, the maneuvering inputs 74 can be pilot inputs, auto-pilot inputs, navigation system based inputs, or any control inputs from one or more outer control loops. In response to inputs from the sensors 72 and maneuvering inputs 74, the FCC 75 transmits signals to various subsystems of the aircraft 10, such as the main rotor system 12 and the elevator control system 42.

The main rotor system 12 can include a main rotor controller 50 configured to receive commands from the FCC 75 to control one or more actuators 55, such as a mechanical-hydraulic or electric actuator, for the rotor blade assemblies 20 of FIGS. 1 and 2. In an embodiment, maneuvering inputs 74 including cyclic, collective, pitch rate, and throttle commands may result in the main rotor controller 50 driving the one or more actuators 55 to adjust a swashplate assembly (not depicted) for pitch control of the rotor blade assemblies 20 of FIGS. 1 and 2. Alternatively, pitch control can be performed without a swashplate assembly.

The elevator control system 42 can include an elevator controller 60 configured to receive commands from the FCC 75 to control one or more actuators 65, such as a mechanical-hydraulic or electric actuator, for the active elevator 44 of FIGS. 1 and 2. In an embodiment, maneuvering inputs 74 include an elevator pitch rate command for the elevator pitch controller 60 to drive the one or more actuator 65 for pitch control of the active elevators 44 of FIGS. 1 and 2.

Rather than simply passing maneuvering inputs 74 through to the controllers 50 and 60, the FCC 75 includes a processing system 90 that applies models and control laws to augment commands based on aircraft state data. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, maneuvering inputs 74, and other sources (not depicted) and communicate with the main rotor controller 50, the elevator controller 60, and other subsystems (not depicted).

Figure 4:
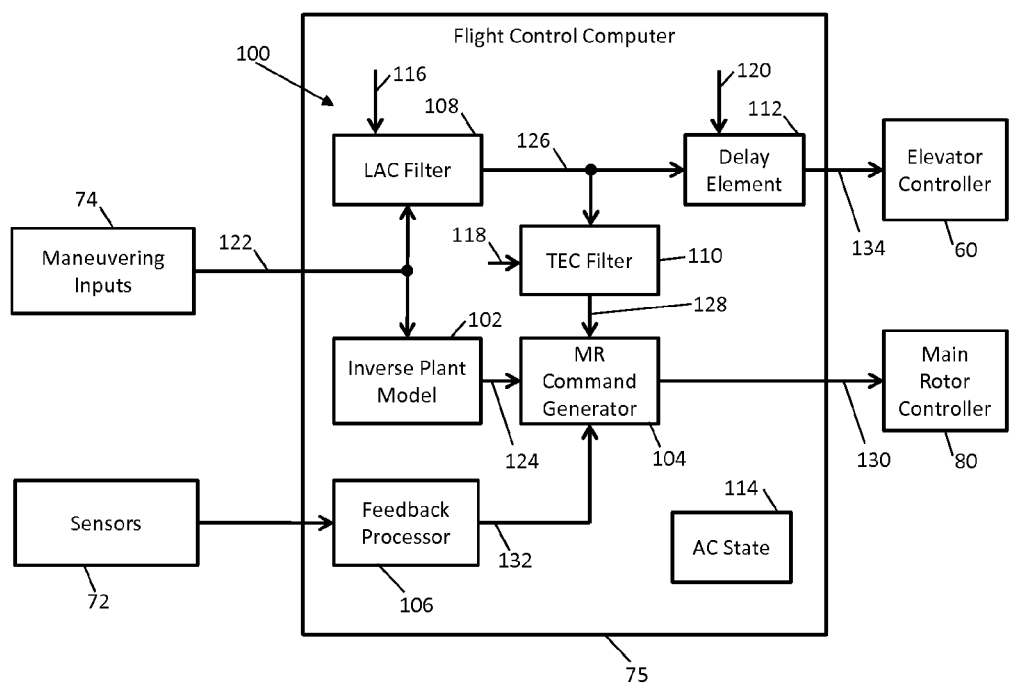
FIG. 4 is a schematic diagram of control logic in a flight control computer of a rotary wing aircraft according to an embodiment.

FIG. 4 depicts a portion of control logic 100 in the FCC 75 and is described with continued reference to FIGS. 1-3. The control logic 100 may be embodied as executable instructions in the memory 94 of FIG. 3, where the processing circuitry 92 of FIG. 3 is configured to read and execute the control logic 100. The control logic 100 can include an inverse plant model 102, a main rotor command generator 104, a feedback processor 106, a load alleviation control (LAC) filter 108, a transformed elevator command (TEC) filter 110, and a delay element 112. The FCC 75 can also determine aircraft state values 114, which may include one or more flight regime parameters, such as airspeed, angle of attack, rotor speed, propeller speed, rotor blade pitch, propeller blade pitch, air density, altitude, and the like. The aircraft state values 114 can be used to make flight-regime based updates to various elements of the control logic 100. For example, a table lookup operation and mapping of at least one flight regime parameter, such as airspeed, to filter coefficients and delay values can be used to configure the LAC filter 108 at configuration data input 116, the TEC filter 110 at configuration data input 118, and/or the delay element 112 at configuration data input 120.

In an exemplary embodiment, the maneuvering inputs 74 provide a pitch rate command 122. The pitch rate command 122 may be defined at an aircraft level and intended primarily for the main rotor system 12 during pitch transient maneuvering. The inverse plant model 102 can model various subsystems of the aircraft 10 of FIG. 1 to determine a response amount corresponding to the maneuvering inputs 74, such as the pitch rate command 122. The inverse plant model 102 may produce a main rotor feed forward command 124 based on the pitch rate command 122. In order to shift pitch moments from the main rotor system 12 to the tail section 41 and reduce loads on the main rotor system 12, the LAC filter 108 produces an elevator command 126 for the elevator control system 42 based on the pitch rate command 122. In the example of FIG. 4, the elevator command 126 is a feed forward command. The TEC filter 110 relates elevator commands to main rotor commands to maintain model following quality independent of the LAC filter 108. The TEC filter 110 produces a main rotor pitch adjustment command 128 based on the elevator command 126.

The main rotor command generator 104 generates an augmented main rotor feed forward command 130 for the main rotor system 12 based on the main rotor feed forward command 124 and the main rotor pitch adjustment command 128. In an embodiment, the main rotor command generator 104 is a summing block that generates the augmented main rotor feed forward command 130 for the main rotor system 12 as a summation of the main rotor feed forward command 124, the main rotor pitch adjustment command 128, and a main rotor feedback adjustment command 132 from the feedback processor 106. The augmented main rotor feed forward command 130 can be sent to the main rotor controller 80 of the main rotor system 12 to drive main rotor pitch changes. The feedback processor 106 converts feedback from a plurality of sensors 72 into the main rotor feedback adjustment command 132, using for example, sensed pitch rate and attitude relative to model values.

The main rotor system 12 may be slower to react to commands as compared to the elevator control system 42. Therefore, the delay element 112 can be included to delay the feed forward elevator command 126 to the elevator control system 42 such that a response of the elevator control system 42 to the elevator command 126 corresponds with a response of the main rotor system 12 to the augmented main rotor feed forward command 130. Accordingly, the output of the delay element 112 to the elevator controller 60 may be referred to as a delayed elevator command 134. As previously noted, the delay element 112 may be configurable via the configuration data input 120 based on at least one flight regime parameter, such as airspeed.

The LAC filter 108 can shape elevator commands to reduce loads applied to the main rotor system 12. The TEC filter 110 relates elevator commands to main rotor commands in a way that model following quality is preserved, independent of selected coefficients for the LAC filter 108. The elevator command 126 can be adjusted based on control saturation or prioritization for other uses. Any nonlinearity in the elevator command 126 is automatically compensated for via the TEC filter 110 producing the main rotor pitch adjustment command 128 for the main rotor feed forward path (i.e., contributes to the augmented main rotor feed forward command 130).

The TEC filter 110 may be defined as a ratio of an inverse plant for a model of a main rotor input to pitch rate relative to an inverse plant for a model of an elevator to pitch rate. The TEC filter 110 allows rapid reconfiguration between using and not using the LAC filter 108 or for failure/saturation of the elevator control system 42. The TEC filter 110 may also provide substantially close model following during LAC filter 108 transitions, such as fading-in or fading-out. The LAC filter 108 may be tuned by identifying a model from elevator input to pitch rate while maintaining a zero dynamic main rotor moment. Tuning can be performed over multiple flight regimes to establish a schedule of filter coefficients for the LAC filter 108. The LAC filter 108 and the TEC filter 110 may be scheduled based on flight conditions and need not be continuously active.

Figure 5:
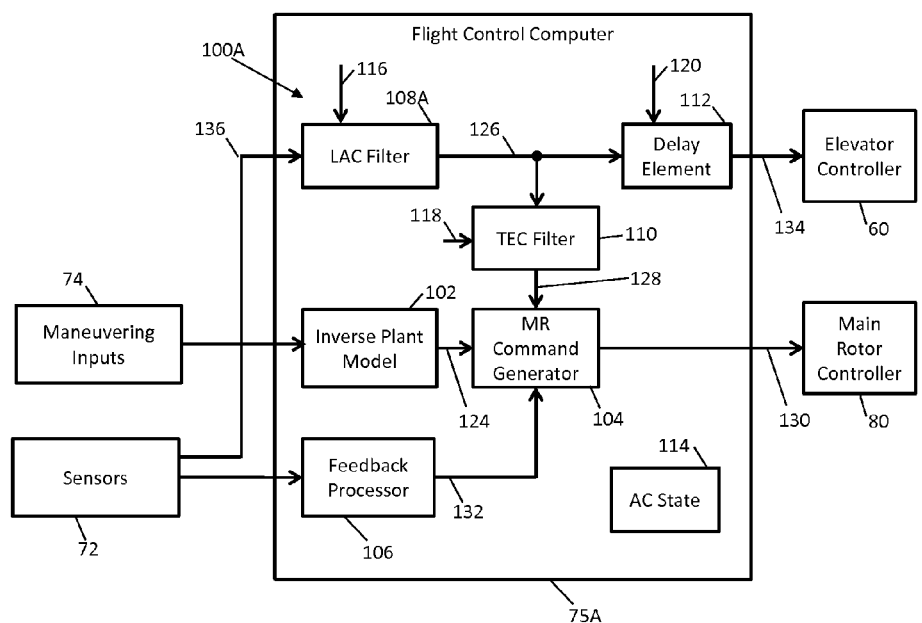
FIG. 5 is a schematic diagram of control logic in a flight control computer of a rotary wing aircraft according to an alternate embodiment.

FIG. 5 is a schematic diagram of a portion of control logic 100A in the FCC 75 of FIG. 3 according to an alternate embodiment. Similar to the control logic 100 of FIG. 4, the control logic 100A of FIG. 5 includes inverse plant model 102, main rotor command generator 104, feedback processor 106, TEC filter 110, delay element 112, and aircraft state values 114 to command the elevator controller 60 and the main rotor controller 80. Rather than using a pitch rate command in a feedback configuration, LAC filter 108A produces the elevator command 126 as a feedback command based on a load related feedback signal 136 from sensors 72. One or more load related feedback signals 136 can be used to drive the elevator command 126, which can also impact performance at TEC filter 110 and delay element 112. Load related feedback signals 136 can include an aircraft angle of attack, a load factor, a main rotor hub moment, a tail load, or other feedback signals. Using such signals extends load reduction capability to disturbance loads on the aircraft 10 of FIG. 1, in addition to maneuvering loads. Steady-state, or trim loads, can also be minimized with the use of feedback control. Similar to the control logic 100 of FIG. 4, once a desired elevator deflection for load reduction is determined, an equivalent main rotor command is determined though the TEC filter 110 and delay element 112. This ensures that the load reducing feedback to the active elevators 44 of FIG. 2 has a minimal impact on pitch handling qualities and stability.

Exemplary embodiments, with continued reference to FIGS. 1-5, include a method of providing elevator load alleviating control on a rotary wing aircraft, such as aircraft 10 that includes a main rotor system 12 and an elevator control system 42. A pitch rate command 122 is received, and a main rotor feed forward command 124 is produced based on the pitch rate command 122. An elevator command 126 for the elevator control system 42 is produced by a LAC filter 108 based on the pitch rate command 122 or a load related feedback signal 136. The LAC filter 108 is configured to reduce loads on the main rotor system 12. A main rotor pitch adjustment command 128 is produced based on the elevator command 126. An augmented main rotor feed forward command 130 for the main rotor system 12 is generated based on the main rotor feed forward command 124 and the main rotor pitch adjustment command 128. A delay element 112 and feedback processor 106 may also be used to generate the delayed elevator command 134 for the elevator controller 60 and the augmented main rotor feed forward command 130 for the main rotor controller 80 respectively.

Technical effects include application of elevator load alleviating control to extend component life by reducing peak static and recurring fatigue loads in a rotary wing aircraft. Incorporating the elevator load alleviating control into an aircraft design may reduce aircraft weight by allowing for material reduction to withstand lower shaft bending loads in the main rotor system. In one example, main rotor shaft bending loads were reduced by about 20% when using elevator load alleviating control as disclosed herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A flight control system for a rotary wing aircraft comprising a main rotor system and an elevator control system, the flight control system comprising:
    a flight control computer configured to interface with the main rotor system and the elevator control system, the flight control computer comprising processing circuitry configured to execute control logic comprising:
        an inverse plant model that produces a main rotor feed forward command based on a pitch rate command;
        a load alleviation control (LAC) filter configured to reduce loads on the main rotor system and produce an elevator command for the elevator control system;
        a transformed elevator command (TEC) filter that produces a main rotor pitch adjustment command based on the elevator command; and
        a main rotor command generator that generates an augmented main rotor feed forward command for the main rotor system based on the main rotor feed forward command and the main rotor pitch adjustment command and sends the augmented main rotor feed forward command to the main rotor system to change a pitch of the main rotor system.

2. The flight control system according to claim 1, wherein the TEC filter comprises a ratio of an inverse plant for a model of a main rotor input to pitch rate relative to an inverse plant for a model of an elevator to pitch rate.

3. The flight control system according to claim 1, wherein the control logic further comprises:
    a feedback processor that converts feedback from a plurality of sensors into a main rotor feedback adjustment command; and
    the main rotor command generator is further configured to generate the augmented main rotor feed forward command for the main rotor system as a summation of the main rotor feed forward command, the main rotor pitch adjustment command, and the main rotor feedback adjustment command.

4. The flight control system according to claim 1, wherein the control logic further comprises a delay element configured to delay the elevator command to the elevator control system such that a response of the elevator control system to the elevator command corresponds with a response of the main rotor system to the augmented main rotor feed forward command.

5. The flight control system according to claim 4, wherein the LAC filter, the TEC filter, and the delay element are configurable based on at least one flight regime parameter.

6. The flight control system according to claim 1, wherein the elevator command produced by the LAC filter is a feed forward command based on the pitch rate command.

7. The flight control system according to claim 1, wherein the elevator command produced by the LAC filter is a feedback command based on a load related feedback signal.

8. The flight control system according to claim 1, wherein the rotary wing aircraft further comprises an auxiliary propulsor configured as a pusher propeller, and the main rotor system further comprises dual contra-rotating main rotors.

9. A rotary wing aircraft comprising:
    at least one maneuvering input comprising a pitch rate command;
    a main rotor system;
    an elevator control system; and
    a flight control computer configured to receive at least one maneuvering input comprising a pitch rate command and coupled to the main rotor system and the elevator control system, wherein the flight control computer comprises processing circuitry configured to execute control logic comprising:
        an inverse plant model that produces a main rotor feed forward command based on the pitch rate command;
        a load alleviation control (LAC) filter configured to reduce loads on the main rotor system and produce an elevator command for the elevator control system;
        a transformed elevator command (TEC) filter that produces a main rotor pitch adjustment command based on the elevator command; and
        a main rotor command generator that generates an augmented main rotor feed forward command for the main rotor system based on the main rotor feed forward command and the main rotor pitch adjustment command.

10. The rotary wing aircraft according to claim 9, wherein the TEC filter comprises a ratio of an inverse plant for a model of a main rotor input to pitch rate relative to an inverse plant for a model of an elevator to pitch rate.

11. The rotary wing aircraft according to claim 9, further comprising a plurality of sensors coupled to the flight control computer, wherein the control logic further comprises:
 a feedback processor that converts feedback from the plurality of sensors into a main rotor feedback adjustment command; and
 the main rotor command generator is further configured to generate the augmented main rotor feed forward command for the main rotor system as a summation of the main rotor feed forward command, the main rotor pitch adjustment command, and the main rotor feedback adjustment command.

12. The rotary wing aircraft according to claim 9, wherein the control logic further comprises a delay element configured to delay the elevator command to the elevator control system such that a response of the elevator control system to the elevator command corresponds with a response of the main rotor system to the augmented main rotor feed forward command.

13. The rotary wing aircraft according to claim 12, wherein the LAC filter, the TEC filter, and the delay element are configurable based on at least one flight regime parameter.

14. The rotary wing aircraft according to claim 9, further comprising an auxiliary propulsor configured as a pusher propeller, wherein the main rotor system further comprises dual contra-rotating main rotors.

15. A method of providing elevator load alleviating control on a rotary wing aircraft comprising a main rotor system and an elevator control system, the method comprising:
 receiving a pitch rate command;
 producing a main rotor feed forward command based on the pitch rate command;
 producing an elevator command for the elevator control system to reduce loads on the main rotor system;
 producing a main rotor pitch adjustment command based on the elevator command; and
 generating an augmented main rotor feed forward command for the main rotor system based on the main rotor feed forward command and the main rotor pitch adjustment command; and
 changing a pitch of the main rotor system based on the augmented main rotor feed forward command.

16. The method according to claim 15, wherein the main rotor pitch adjustment command is produced by a transformed elevator command (TEC) filter comprising a ratio of an inverse plant for a model of a main rotor input to pitch rate relative to an inverse plant for a model of an elevator to pitch rate.

17. The method according to claim 15, wherein the elevator command is a feed forward command based on the pitch rate command.

18. The method according to claim 15, wherein the elevator command is a feedback command based on a load related feedback signal.

19. The method according to claim 15, further comprising:
 converting feedback from a plurality of sensors into a main rotor feedback adjustment command; and
 generating the augmented main rotor feed forward command for the main rotor system comprises a summation of the main rotor feed forward command, the main rotor pitch adjustment command, and the main rotor feedback adjustment command.

20. The method according to claim 15, further comprising:
 applying a delay to the elevator command to the elevator control system such that a response of the elevator control system to the elevator command corresponds with a response of the main rotor system to the augmented main rotor feed forward command.

* * * * *